United States Patent
Gros et al.

(10) Patent No.: US 9,409,622 B2
(45) Date of Patent: Aug. 9, 2016

(54) POWER MANAGEMENT IN AN ELECTRICALLY-ASSISTED VEHICLE

(75) Inventors: Jean-Philippe Gros, Le Fontanil Cornillon (FR); Charlie Barla, Lille (FR); Sylvain Joalland, Grenoble (FR); Timothee Jobert, Grenoble (FR); Stephanie Riche, Grenoble (FR)

(73) Assignee: Commissariat a l'energie atomique et aux energies alternatives (FR)

( * ) Notice: Subject to any disclaimer, the term of this patent is extended or adjusted under 35 U.S.C. 154(b) by 108 days.

(21) Appl. No.: 14/126,079

(22) PCT Filed: Apr. 30, 2012

(86) PCT No.: PCT/FR2012/050959
§ 371 (c)(1),
(2), (4) Date: Apr. 17, 2014

(87) PCT Pub. No.: WO2012/172227
PCT Pub. Date: Dec. 20, 2012

(65) Prior Publication Data
US 2014/0236407 A1    Aug. 21, 2014

(30) Foreign Application Priority Data
Jun. 14, 2011   (FR) .................................... 11 55176

(51) Int. Cl.
*G06F 7/00*       (2006.01)
*B62M 6/45*      (2010.01)
*B62J 99/00*     (2009.01)

(52) U.S. Cl.
CPC . *B62M 6/45* (2013.01); *B62J 99/00* (2013.01); *B62J 2099/0013* (2013.01)

(58) Field of Classification Search
CPC ..... B60W 20/00; B60W 10/08; B60W 10/06; Y03T 10/6286; B60K 6/445
USPC .......................................................... 701/22
See application file for complete search history.

(56) References Cited

U.S. PATENT DOCUMENTS

| | | | |
|---|---|---|---|
| 6,163,148 A * | 12/2000 | Takada | B62M 6/45 180/206.3 |
| 7,833,135 B2 | 11/2010 | Radow et al. | |
| 8,660,728 B2 * | 2/2014 | Saida | B60L 11/007 280/210 |

(Continued)

FOREIGN PATENT DOCUMENTS

| | | |
|---|---|---|
| DE | 19600243 A1 | 7/1997 |
| EP | 1295785 A1 | 3/2003 |
| FR | 2938233 A1 | 5/2010 |

OTHER PUBLICATIONS

Officer: Alain Gaillard, "International Search Report for International Patent Application No. PCT/FR2012/050959," Jul. 26, 2012, Publisher: PCT, Published in: FR.

(Continued)

*Primary Examiner* — Ian Jen
(74) *Attorney, Agent, or Firm* — Kaplan Breyer Schwartz & Ottesen LLP

(57) ABSTRACT

A method for energy management in an electrically assisted vehicle includes the steps of determining the quantity of total energy required for a journey and allocating a quantity of electrical energy to the journey and deducing the quantity of human energy required for the journey on the basic thereof, or allocating a quantity of human energy to the journey and deducing the quantity of electrical energy required for the journey on the basis thereof.

12 Claims, 3 Drawing Sheets

(56) References Cited

U.S. PATENT DOCUMENTS

| | | | |
|---|---|---|---|
| 8,684,922 B2 | 4/2014 | Tran | |
| 8,965,610 B2* | 2/2015 | Boyle | B62M 6/50 180/206.1 |
| 2002/0014366 A1 | 2/2002 | Turner | |
| 2002/0188387 A1 | 12/2002 | Woestman et al. | |
| 2010/0138098 A1 | 6/2010 | Takahara et al. | |
| 2010/0292914 A1* | 11/2010 | Vepsalainen | G01C 21/3453 701/532 |
| 2011/0254673 A1* | 10/2011 | Jean | B62M 6/45 340/432 |
| 2014/0236407 A1* | 8/2014 | Gros | B62J 99/00 701/22 |

OTHER PUBLICATIONS

"International Patent Application No. PCT/FR2012/050959", "Written Opinion of the International Search Authority", Publisher: PCT, Published in: FR.

"International Patent Application No. PCT/FR2012/050960", "Written Opinion of the International Search Authority", Publisher: PCT, Published in: FR.

"Non-final Office Action", dated Apr. 27, 2015, issued in related U.S. Appl. No. 14/126,407.

"Notice of Allowance", issued in related co-pending U.S. Appl. No. 14/126,407 on Sep. 10, 2015.

* cited by examiner

POWER MANAGEMENT IN AN ELECTRICALLY-ASSISTED VEHICLE

BACKGROUND

The present invention relates to a method of power management in an electrically-assisted vehicle such as an electrically-assisted bicycle. It will be within the abilities of those skilled in the art to adapt the provided method to other types of electrically-assisted vehicles, for example, a electrically-assisted scooter, an electrically-assisted oar, etc. More generally, in the present application, electrically-assisted vehicle designates any vehicle intended to be driven by human force, and provided with a motor-driven electrically assistance capable of completing human power or of occasionally replacing it.

DISCUSSION OF THE RELATED ART

FIG. 1 very schematically shows an electrically-assisted bicycle 1. Such a bicycle comprises a crank gear 3, connected to the back wheel hub via a chain and toothed wheels (not shown). Bicycle 1 further comprises a pedal-assist motor 5, electrically powered by a battery 7. Motor 5 is arranged so that, in operation, it rotates the back hub to relieve the cyclist's effort. There exist variations where the assistance motor can be arranged to drive the crank gear, the front hub, or the actual wheel, for example, via a friction roller. In the shown example, battery 7 is located at the level of the back luggage carrier of the bicycle.

Bicycle 1 comprises a control unit 9 enabling the user to control the starting of motor 5. Unit 9 for example enables to choose from among a plurality of assistance levels (low, medium, high, etc.).

Control unit 9 also comprises an indicator of the battery charge state. It may be a display directly displaying the total quantity of electric power available in the battery, in the form of a numerical value (for example, in ampere hours) or in the form of a graphic representation. The display may also display in real time the electric power consumed by the motor (for example, in watts) and various pieces of information such as the speed, the number of kilometers traveled, etc.

In certain systems, unit 9 displays an estimate of the number of kilometers that the user can still travel before the battery reaches a critical discharge level. It however is a rough estimate, calculated, for a given assistance level, by only taking into account the battery charge state.

A disadvantage of current control systems is that they do no enable to provide an accurate indication of the bicycle range.

Another disadvantage of current control systems is that they do not enable the user to intelligently manage the use of the power assistance during an itinerary.

SUMMARY

An object of an embodiment of the present invention is to provide a method of power management in an electrically-assisted vehicle such as an electric bicycle, at least partly overcoming some of the disadvantages of current solutions.

An object of an embodiment of the present invention is to provide a power management method enabling to determine the vehicle range with more accuracy than current solutions.

An object of an embodiment of the present invention is to provide a power management method enabling the user to easily choose an itinerary according to the quantity of electric power available in the battery.

An object of an embodiment of the present invention is to provide a power management method enabling the user to better manage his effort during an itinerary, by taking into account the quantity of electric power available in the battery.

Thus, an embodiment of the present invention provides a method of power management in an electrically-assisted vehicle, this method being implemented by an on-board computer provided in the vehicle, comprising the steps of: a) dividing into elementary sections an itinerary between a starting point and an arrival point; b) for each elementary section, determining the total amount of power necessary to travel the section, assigning an amount of human power to the section, and deducing therefrom the amount of electric power necessary to travel the section; and c) deducing the last elementary section that the vehicle can travel from the starting point before a battery of the vehicle reaches a threshold.

According to an embodiment of the present invention, steps a) and c) are repeated for a plurality of different itineraries having a same starting point.

According to an embodiment of the present invention, the power management method further comprises a step of displaying in the form of a cartographic representation a plurality of points that the user is capable of reaching before the battery reaches the threshold.

According to an embodiment of the present invention, the total amount of power necessary to travel a section is determined by taking into account prerecorded topographic data specific to the section.

According to an embodiment of the present invention, the power management method comprises a step of measuring the average power delivered by the user.

According to an embodiment of the present invention, the power management method comprises a step of geolocation of the vehicle.

According to an embodiment of the present invention, the power management method comprises a step of measuring the total amount of power available in a battery of the vehicle.

Another embodiment of the present invention provides a power management system in an electrically-assisted cycle, comprising an on-board computer capable of: dividing into elementary sections an itinerary between a starting point and an arrival point; for each elementary section, determining the total amount of power necessary to travel the section, assigning an amount of human power to the section, and deducing therefrom the amount of electric power necessary to travel the section; and deducing the last elementary section that the vehicle can travel from the starting point before a battery of the vehicle reaches a threshold.

BRIEF DESCRIPTION OF THE DRAWINGS

The foregoing and other features and advantages will be discussed in detail in the following non-limiting description of specific embodiments in connection with the accompanying drawings, among which.

DETAILED DESCRIPTION

To help the user manage the use of the electric power in an electrically-assisted vehicle such as an electrically-assisted bicycle, a method comprising a step of determining the total amount of power necessary to travel a section is here provided. Knowing the total amount of power necessary to travel the section, an amount of electric power is assigned to the section and the effort, that is, the amount of human power to be provided by the user to travel the section, is deduced therefrom. In an alternative embodiment of the provided method, an amount of electric power is assigned to the section and, knowing the average power delivered by the user, it is deduced whether the vehicle can or not travel the entire section.

Figure 1:
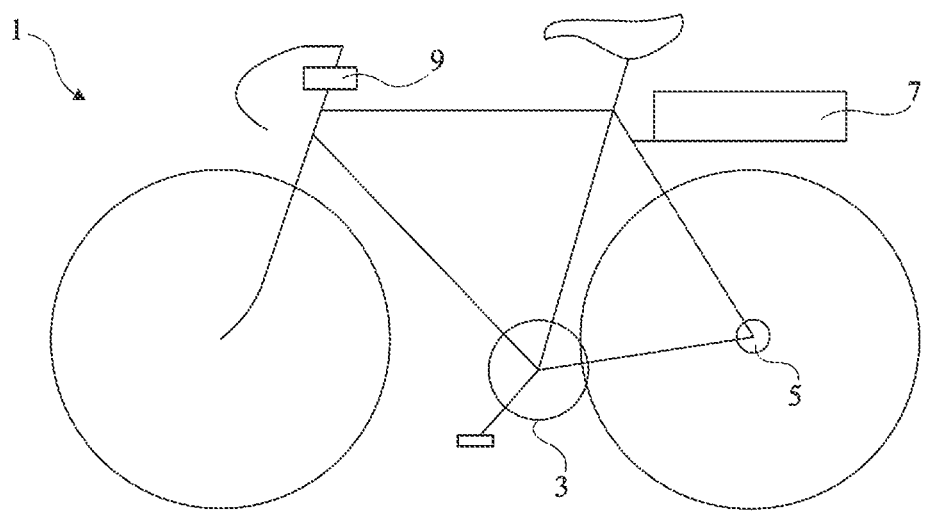
FIG. 1, previously described, schematically shows an example of electrically-assisted bicycle.
Figure 2:
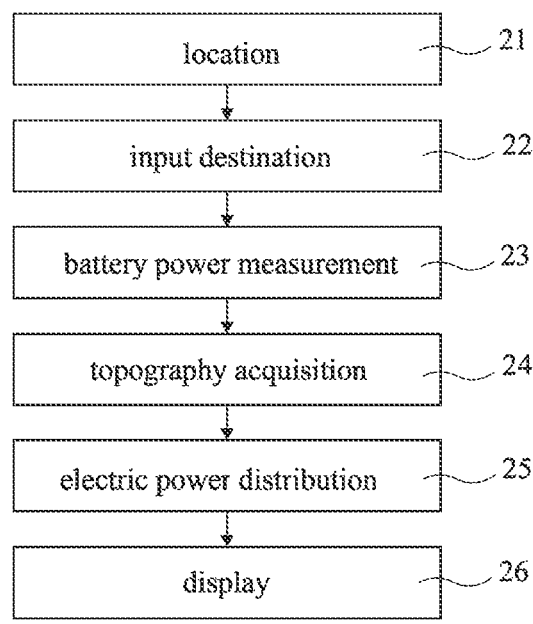
FIG. 2 is a timing diagram showing steps of an embodiment of a method of power management in an electrically-assisted vehicle, enabling to manage the use of the assistance along an itinerary.

FIG. 2 is a flowchart showing steps of an embodiment of a method of power management in an electrically-assisted bicycle. In this example, the method is at least partially implemented by a management system such as an on-board computer or an equivalent system comprising at least one calculation unit. The on-board computer is associated with a navigation system and can access cartographic databases. The navigation system is preferably associated with geolocation means, for example, a GPS ("Global Positioning System"). The navigation system may further access prerecorded topographic data, for example, a topographic database, so that, for a given itinerary, the on-board computer can determine in advance the topographic profile of the itinerary.

During a step 21 ("location"), the starting point of an itinerary to be traveled is determined. The starting point may correspond to the current position of the bicycle, automatically determined by the geolocation means. In an alternative embodiment, the user may himself input the coordinates of the starting point of the itinerary.

During a step 22 ("input destination"), the user inputs the coordinates of a destination, or arrival point of the itinerary to be traveled.

During a step 23 ("battery power measurement"), the management system measures the amount of electric power available in the battery, for example, by means of a gauge connected both to the battery and to the on-board computer.

During a step 24 ("topography acquisition"), the system acquires the topographic data corresponding to the itinerary determined at steps 21 and 22, and deduces therefrom the topographic profile of the itinerary, that is, the elevation as a function of distance. Topographic maps may be pre-recorded in the on-board computer. In another embodiment, the on-board computer may access a distant server containing cartographic and/or topographic data by means of wireless communication means, for example, of GSM type.

During a step 25 ("electric power distribution"), the total amount of power (electric+human) necessary to travel the itinerary is determined, and the amount of available electric power is distributed and assigned to different portions of the itinerary.

In a preferred embodiment, the itinerary is divided into elementary sections or routes. For each section, the total power required to travel the section is determined, taking into account the topographic profile of the section. Other parameters may be taken into account, such as the average displacement speed desired over the section and the bicycle weight, including the cyclist, or also the wind speed and the tire pressure, by means of appropriate sensors enabling, in particular, to estimate the different components opposing the bicycle motion.

The amount of power available in the battery is then distributed between the different sections. Each section is assigned an amount of electric power selected so that the user can travel the entire itinerary without for the battery to reach a critical discharge level or threshold. As an example, if the vehicle is provided with a system for recharging the battery in downhill slopes, the electric power distribution method takes it into account. Thus, if the itinerary comprises downhill sections, a greater part of the available electric power is assigned to the sections preceding the downhill sections, since it is known that the battery will at least partially recharge during downhill slopes. More generally, it is provided to distribute the available electric power to minimize and to better distribute the user's effort while ascertaining that he reaches his destination with still a minimum battery charge level. Of course, according to the itinerary, and possibly of a usage mode selected by the user (city, leisure, sports, etc.), it may be provided not to consume the entire available electric power, and thus to adjust the electric assistance level. As a variation, if the electric battery appears not to contain enough power to travel the entire itinerary, it may be provided to decrease the assistance level on certain less demanding sections and to require an additional human power contribution from the user. In an embodiment, the user may select a desired average speed over the itinerary. The electric power may then be distributed to respect at best the desired speed all along the itinerary.

Knowing the total amount of power necessary to travel each section, and having assigned to each section an amount of electric power, the system deduces the amount of human power to be delivered by the user to travel each section.

It should be noted that one of the criteria of distribution of the electric power at step 25 may precisely be to make the effort requested from the user as uniform as possible all along the itinerary. Any other electric power distribution criterion may be selected.

During a step 26 ("display"), the on-board computer indicates to the user, for each section of the itinerary, the amount of power or the average power that he should deliver to travel the section. Optionally, a feedback control of the electric power-assist motor may be provided to automatically control the assistance level according to the amount of electric power assigned to each section at step 25. This enables for the user to envisage no other manipulation than inputting his destination coordinates.

Figure 3:
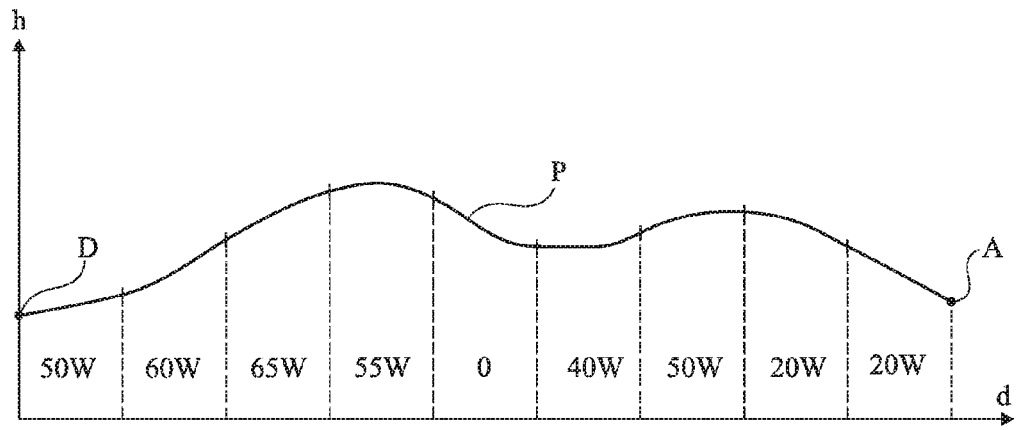
FIG. 3 illustrates an example of display of data determined by the method described in relation with FIG. 2.

FIG. 3 illustrates, as an example, a mode of display, for the user, of data determined by the method described in relation with FIG. 2. A display screen of the on-board computer displays topographic profile P of the itinerary, that is, elevation h as a function of distance d, between starting point D and arrival point A of the itinerary. Profile P is divided into sections, and for each section, the human power that the cyclist will have to deliver to travel the section is indicated. In this example, the average power is indicated in watts. The invention is of course not limited to this specific display mode. Any other form of display may be provided.

Further, it may be provided to recalculate the electric power distribution at one or a plurality of intermediate points of the itinerary. This enables to readjust the calculation in the case where, on the sections already traveled, the cyclist would have delivered more or less than the initially-determined recommended average effort.

An advantage of the provided method is that it enables to manage the use of the electric power assistance along an itinerary selected by the user.

It should in particular be noted that the use of prerecorded topographic data enables to anticipate the elevation data over the complete travel, and thus to anticipate the power consumption over the travel.

Figure 4:
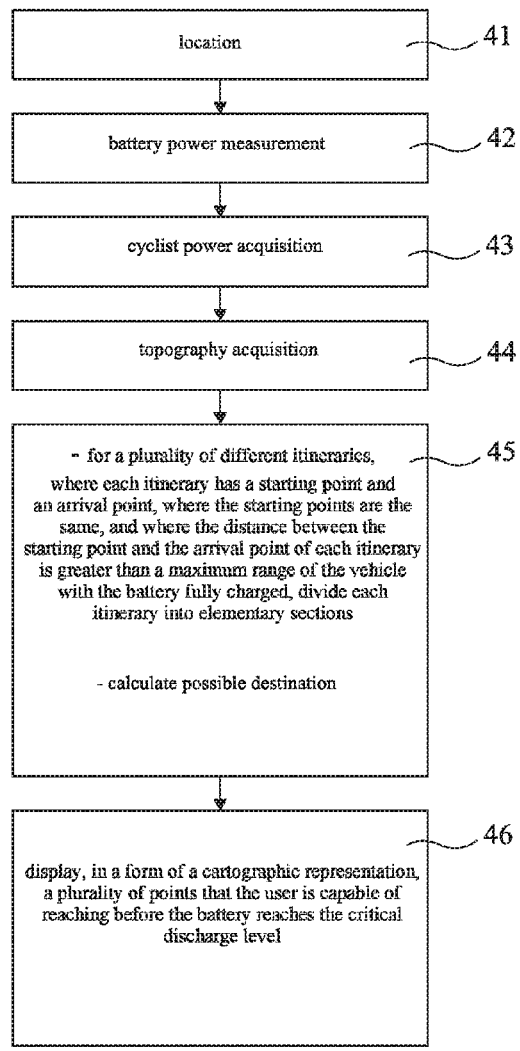
FIG. 4 is a flowchart showing steps of an embodiment of a method of power management in an electrically-assisted bicycle, enabling the user to choose an itinerary according to the amount of electric power available in the battery.

FIG. 4 is a flowchart showing steps of another embodiment of a method of power management in an electrically-assisted bicycle.

During a step 41 ("location"), the cyclist's starting point is determined. The starting point for example corresponds to the current position of the vehicle, and may be automatically determined by geolocation means. As a variation, the user may himself input the coordinates of the starting point.

At a step 42 ("battery power measurement"), the management system measures the quantity of electric power available in the battery, for example, by means of a gauge connected to the on-board computer.

At a step 43 ("cyclist power acquisition"), the average power delivered by the cyclist (human power) is determined. In a simplified embodiment, it may be a value pre-recorded in the on-board computer. A system comprising a plurality of usage modes (city, leisure, sports, etc.) may for example be provided, each usage mode corresponding to a value of the average power delivered by the cyclist. In a preferred embodiment, the average delivered power is measured in situ by means of adapted sensors provided on the bicycle.

At a step 44 ("topography acquisition"), the system acquires the cartographic and topographic data of a geographic area having as a center the starting point determined at step 41.

At a step 45 ("calculation of possible destinations"), the on-board computer calculates, taking into account the average power delivered by the cyclist as well as the available electric power and the topography, the maximum distance that the bicycle can travel (or bicycle range), in one or a plurality of directions from the starting point determined at step 41. In an embodiment, an angular scanning of the map is performed, from the starting point determined at step 41. The vehicle range is calculated for all the successive scanning directions. As an example, an angular resolution between 1 and 10 degrees may be selected. This enables to specifically indicate to the user his radius of action, that is, all the points that he can reach without for the battery to reach a critical discharge level.

In an embodiment, for each angular scanning direction, the point determined at step 41 is selected as the starting point of an itinerary. A point sufficiently distant from the starting point and belonging to the considered angular direction is selected as the arrival point of the itinerary. "Sufficiently distant" means that the distance between the starting point and the arrival point is greater than the maximum range of the bicycle in favorable conditions. For example, the arrival point may be selected at a distance from the starting point 1.5 greater than the theoretical range of the bicycle on level ground, with a charged battery.

The itinerary thus determined is divided into sections or elementary sections. For each section, the total power required to travel the section is determined, taking into account the prerecorded topographic data. Other parameters may be taken into account, such as the average displacement speed over the section and the bicycle weight, or also the air resistance (for example, estimated by measuring the wind speed) or the rolling resistance (for example estimated by measuring the tire pressure). The amount of human power delivered by the cyclist on each section is calculated, taking into account the cyclist's average power determined at step 43. Thus, each section is assigned a given amount of human power. Knowing the total amount of power necessary to travel each section, and the amount of human power assigned to each section, the system determines the amount of electric power necessary to travel each section. The last section of the itinerary that can be traveled from the starting point before the battery reaches a critical discharge level is then determined.

Any other adapted method may be used to determine the most distant point that the cyclist can reach in a given direction.

In an alternative embodiment, to determine the possible destinations, the cartographic data are used to only consider destinations and itineraries located on roads or tracks where a bicycle can be ridden.

At a step 46 ("display"), the on-board computer indicates to the user, for each direction of the angular scanning performed at step 45, the vehicle range. This information is for example displayed on a geographic map, in the form of a curve showing all the destinations accessible from the starting point determined at step 41.

Figure 5:
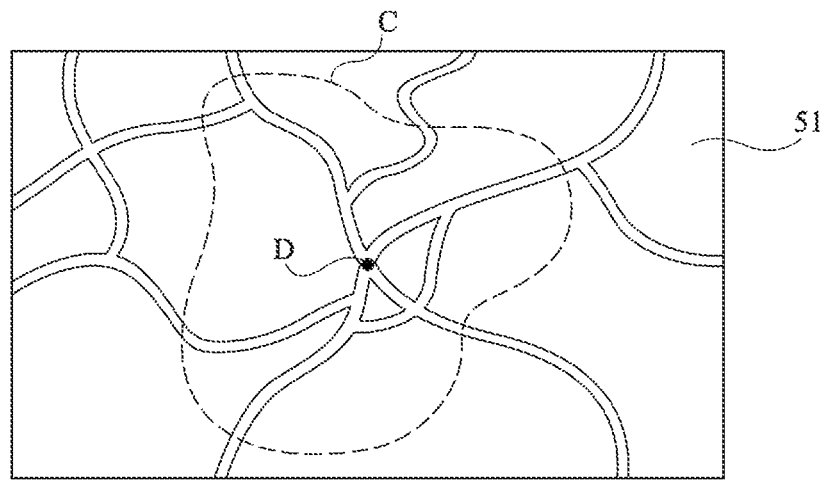
FIG. 5 illustrates an example of display of data determined by the method described in relation with FIG. 4.

FIG. 5 illustrates, as an example, a mode of display, for the user, of data determined by the method described in relation with FIG. 4. A display screen of the on-board computer displays map 51 of a geographic area having as a center starting point D determined at step 41. A curve C showing all the destinations accessible from starting point D is overlaid on map 51. Any other form of display may of course be provided. It may in particular be provided to display a plurality of curves, corresponding to a plurality of assistance levels (sports, city, leisure, etc.) and/or of average power delivered by the cyclist. It may further be provided to recalculate the possible destinations on the way, to readjust curve C in the case where the cyclist would have delivered more or less than the effort corresponding to the average power determined at step 43.

An advantage of this embodiment is that it enables to more accurately and more realistically determine the vehicle range than current solutions. Further, the provided power management method enables the user to easily select an itinerary, taking into account the real range of the vehicle over this itinerary.

Figure 6:
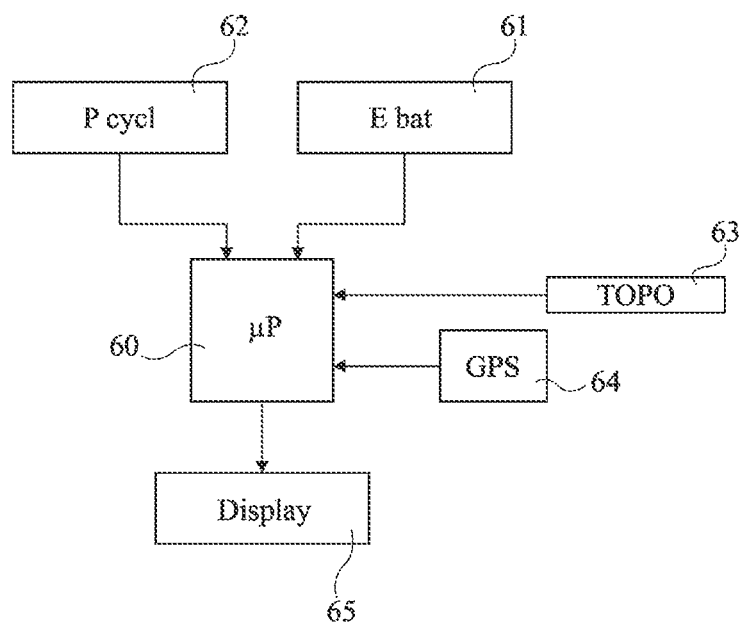
FIG. 6 is a block diagram showing in simplified fashion an embodiment of a system of power management in an electrically-assisted bicycle.

FIG. 6 is a block diagram showing in simplified fashion an embodiment of a system of power management in an electrically-assisted bicycle.

The management system comprises a calculation unit 60 (μP), for example corresponding to a on-board computer microprocessor. A sensor 62 ($P_{cycl}$) capable of measuring the power delivered by the cyclist is connected to calculation unit 60. A sensor 61 ($E_{bat}$) capable of determining the amount of electric power available in the battery is connected to calculation unit 60. Calculation unit 60 is further connected to a topographic and/or cartographic data base 63 (Topo). Database 63 may be local, that is, recorded in a memory of the on-board computer. As a variation, database 63 may be recorded by a distant server to which the on-board computer can access by wireless communication means, for example, via a GSM-type network. In this example, a geolocation module 64 (GPS) is connected to calculation unit 60. Further, a display 65 (Display) is provided, to display data for the user.

Specific embodiments of the present invention have been described. Various alterations, modifications, and improvements will readily occur to those skilled in the art.

In particular, the invention is not limited to the above-described examples where the total power necessary to travel a section is determined by taking into account the real topography of the section. Simpler embodiments may be provided, where the total power necessary to travel a section is determined by taking into account the length of the section and, possibly, a standard average elevation (pre-recorded) corresponding to a usage mode selected by the user (flat ground, hills, mountain, etc.).

Further, the provided power management method has been more specifically described in relation with an example of use in an electrically-assisted bicycle. The present invention is not limited to this specific example.

The invention claimed is:

1. A method of power management in an electrically-assisted vehicle, the method being implemented by an on-board computer provided in the vehicle, the method comprising the steps of:
   measuring the quantity of electric power available in a battery of the vehicle;
   for a plurality of different itineraries, wherein each of the plurality of different itineraries has a starting point and an arrival point, wherein the starting points of the plurality of different itineraries are the same, and wherein the distance between the starting point and the arrival point of each of the plurality of different itineraries is greater than a maximum range of the vehicle with the battery fully charged, dividing each of the itineraries into elementary sections;
   for each of the elementary sections, determining the total amount of power necessary to travel the section, assigning an amount of human power to the section, and deducing therefrom the amount of electric power necessary to travel the section;
   deducing, for each of the itineraries, the last elementary section of the itinerary that the vehicle can travel from the starting point before the battery of the vehicle reaches a critical discharge level; and
   displaying, in a form of a cartographic representation, a plurality of points that the user is capable of reaching before the battery reaches the critical discharge level.

2. The method of claim 1, wherein said total amount of power necessary to travel a section is determined by taking into account prerecorded topographic data specific to said section.

3. The method of claim 1, further comprising a step of measuring the average power delivered by the user.

4. The method of claim 1, further comprising a step of geolocation of the vehicle.

5. The method of claim 1, further comprising a step of measuring the total amount of power available in a battery of the vehicle.

6. A power management system in an electrically-assisted cycle, comprising an on-board computer capable of:
   measuring the quantity of electric power available in a battery of the vehicle;
   for a plurality of different itineraries, wherein each of the plurality of different itineraries has a starting point and an arrival point, wherein the starting points of the plurality of different itineraries are the same, and wherein the distance between the starting point and the arrival point of each of the plurality of different itineraries is greater than a maximum range of the vehicle with the battery fully charged, dividing each of the itineraries into elementary sections;
   for each of the elementary sections, determining the total amount of power necessary to travel the section, assigning an amount of human power to the section, and deducing therefrom the amount of electric power necessary to travel the section;
   deducing, for each of the itineraries, the last elementary section of the itinerary that the vehicle can travel from the starting point before the battery of the vehicle reaches a critical discharge level; and
   displaying, in a form of a cartographic representation, a plurality of points that the user is capable of reaching before the battery reaches the critical discharge level.

7. The method of claim 1, wherein said total amount of power necessary to travel a section is determined by taking into account prerecorded topographic data specific to said section.

8. The method of claim 1, further comprising a step of measuring the average power delivered by the user.

9. The method of claim 2, further comprising a step of measuring the average power delivered by the user.

10. The method of claim 1, further comprising a step of geolocation of the vehicle.

11. The method of claim 2, further comprising a step of geolocation of the vehicle.

12. The method of claim 3, further comprising a step of geolocation of the vehicle.

* * * * *